(12) United States Patent
Iannce et al.

(10) Patent No.: US 10,488,528 B2
(45) Date of Patent: Nov. 26, 2019

(54) SYSTEM AND METHODS FOR COMMISSIONING AND MAINTAINING INDUSTRIAL EQUIPMENT

(71) Applicant: EATON INTELLIGENT POWER LIMITED, Dublin (IE)

(72) Inventors: Stephan P. Iannce, Clay, NY (US); Joseph Michael Manahan, Manlius, NY (US)

(73) Assignee: EATON INTELLIGENT POWER LIMITED, Dublin (IE)

( * ) Notice: Subject to any disclaimer, the term of this patent is extended or adjusted under 35 U.S.C. 154(b) by 257 days.

(21) Appl. No.: 15/279,160

(22) Filed: Sep. 28, 2016

(65) Prior Publication Data
US 2017/0094503 A1 Mar. 30, 2017

Related U.S. Application Data

(60) Provisional application No. 62/233,943, filed on Sep. 28, 2015, provisional application No. 62/233,503, filed on Sep. 28, 2015.

(51) Int. Cl.
| | |
|---|---|
| *H04M 3/00* | (2006.01) |
| *G01S 19/51* | (2010.01) |
| *G01D 21/02* | (2006.01) |
| *G01S 19/49* | (2010.01) |
| *H04N 1/00* | (2006.01) |
| *H04N 1/32* | (2006.01) |
| *H04W 4/80* | (2018.01) |

(52) U.S. Cl.
CPC .............. *G01S 19/51* (2013.01); *G01D 21/02* (2013.01); *G01S 19/49* (2013.01); *H04N 1/00106* (2013.01); *H04N 1/32101* (2013.01); *H04W 4/80* (2018.02)

(58) Field of Classification Search
CPC ...... H04N 19/172; H04W 4/04; H04W 4/023; H04W 4/025; H04W 64/00
See application file for complete search history.

(56) References Cited

U.S. PATENT DOCUMENTS

| | | |
|---|---|---|
| 2010/0141445 A1 | 6/2010 | Venkatasubramaniyam et al. |
| 2011/0004685 A1 | 1/2011 | De Groot et al. |
| | (Continued) | |

FOREIGN PATENT DOCUMENTS

WO 2010/132761 A2 11/2010

OTHER PUBLICATIONS

International Search Report and Written Opinion for Application No. PCT/US2016/054228 dated Jan. 12, 2017.

*Primary Examiner* — Khalid W Shaheed
(74) *Attorney, Agent, or Firm* — Merchant & Gould P.C.

(57) ABSTRACT

A system comprises a smart device that includes a processor and a memory. The smart device processor is configured to executed instructions stored in memory and the smart device to: wirelessly detect both the presence of a non-commissioned field-deployed product and a unique identification (ID) associated with the non-commissioned field-deployed product; take a photograph of the non-commissioned field-deployed product; obtain location data of the non-commissioned field-deployed product; and wirelessly transmit the unique ID, photograph and location data to establish a commissioned status of the non-commissioned field-deployed product.

20 Claims, 5 Drawing Sheets

(56) References Cited

U.S. PATENT DOCUMENTS

| | | | |
|---|---|---|---|
| 2012/0083995 A1* | 4/2012 | Vorona | G08G 1/0104 |
| | | | 701/119 |
| 2014/0156225 A1 | 6/2014 | Dagnino et al. | |
| 2014/0173642 A1* | 6/2014 | Vinson | G06Q 50/01 |
| | | | 725/9 |
| 2014/0262130 A1 | 9/2014 | Yenni et al. | |
| 2014/0267832 A1* | 9/2014 | Anderson | H04N 1/2112 |
| | | | 348/231.99 |
| 2014/0280199 A1 | 9/2014 | Bare et al. | |
| 2015/0242855 A1* | 8/2015 | Vilnai | B67D 7/34 |
| | | | 705/44 |
| 2016/0285416 A1* | 9/2016 | Tiwari | H02S 50/15 |
| 2018/0121571 A1* | 5/2018 | Tiwari | G06F 17/5004 |

\* cited by examiner

SYSTEM AND METHODS FOR COMMISSIONING AND MAINTAINING INDUSTRIAL EQUIPMENT

CLAIMS TO PRIORITY

The present application claims priority to U.S. provisional patent application No. (1) 62/233,503, filed Sep. 28, 2015, and entitled "Application Based GPS Location Commissioning System and Process"; and (2) 62/233,943, filed Sep. 28, 2015, and entitled "System and Methodology for Commissioning and Maintaining Industrial Equipment." Both of the noted provisional patent applications are hereby incorporated by reference in their entirety.

FIELD OF THE DISCLOSURE

The present disclosure generally relates to locating, commissioning and monitoring field-deployed industrial products.

BACKGROUND

Examples of industrial equipment can include electrical fittings and glands, motor and pump control components, panelboards incorporating circuit breakers or other electrical components, switches such as safety switches, enclosures (e.g., terminal enclosures, outlet boxes, junction boxes, explosion-proof enclosures, etc.), lighting and light fittings, plugs and receptacles. Industrial equipment is often deployed in harsh or hazardous environments where degradation can lead to equipment failure. Thus, knowing what equipment has been commissioned, as well as where and when it is commissioned can be important parameters to track. However, tracking can be a tedious process that often gets overlooked or simply ignored.

One way to determine position and monitor status of a product is to provide each product with a GPS (global positioning system) chip. However, adding a GPS to each product introduces several challenges including: (1) the cost of the GPS chip; (2) how to integrate the GPS chip into the product; and (3) access to antennas that are able to receive signals from the GPS (access may be impossible if the location of the product is remote). Alternatively, the GPS location of a product may be manually entered. However, manually entering a GPS coordinate for each product is tedious, error-prone process that will, more likely than not, be omitted due to the large number of products that may be commissioned at one time.

SUMMARY

The present disclosure is, in one aspect, directed to a smart device, application based GPS location commissioning process that greatly simplifies the commissioning process of field-deployed product with little to no associated extra cost. A wireless transmission from the smart device (which includes a unique identifier associated with the field-deployed product along with a photograph of the product and location data of the product) to a centralized computing device is used to established a commissioned status for the field-deployed product. As such, the smart device commissioning process increases the likelihood of adoption, reduces errors and decreases commissioning costs.

In another aspect, the present disclosure is directed to utilizing the centralized computing device in conjunction with a plurality of sensing and/or monitoring devices to establish an overall health score for each commissioned, field-deployed product. The health score is based on real-time and/or historic monitoring of parameters relating to the internal and external environments of commissioned, field-deployed products as well as parameters relating to the specific operation of the commissioned, field-deployed products.

In another aspect, the present disclosure is directed to a system comprising a smart device that includes a processor and a memory. The smart device processor is configured to executed instructions stored in memory and the smart device to: wirelessly detect both the presence of a non-commissioned field-deployed product and a unique identification (ID) associated with the non-commissioned field-deployed product; take a photograph of the non-commissioned field-deployed product; obtain location data of the non-commissioned field-deployed product; and wirelessly transmit the unique ID, photograph and location data to establish a commissioned status of the non-commissioned field-deployed product.

In another aspect, the present disclosure is directed to a system comprising a smart device as described immediately above and a computing device. The computing device has a processor and a memory. The computing device processor is configured to execute instructions stored in the computing device memory which cause the computing device to: wirelessly receive the transmission from the smart device; verify that each of the unique ID, photograph and location data are included in the transmission; verify that the transmitted unique ID matches a corresponding ID in the computing device memory; when both verifications occur, associate the photograph and location data with the corresponding ID in the computing device memory; and change a status of the non-commissioned field-deployed product from non-commissioned to commissioned.

In another aspect, the present disclosure is directed to a system comprising a field-deployed product, a plurality of sensors, a wireless communication device and a computing device. The field-deployed product includes industrial equipment. The plurality of sensors are configured to monitor different operational and/or environmental parameters related to the field-deployed product and produce corresponding outputs that are representative of the parameters. The wireless communication device is configured to wirelessly transmit the outputs of the sensors. The computing device is configured to receive the outputs and determine an overall healthscore for the field-deployed product based on the received outputs. The computing device is further configured to categorize a severity of the healthscore and produce a recommendation for maintenance of the field-deployed product based on the severity.

The above summary is not intended to describe each embodiment or every implementation. A more complete understanding will become apparent and appreciated by referring to the following detailed description and claims in conjunction with the accompanying drawings.

DETAILED DESCRIPTION

For products deployed in harsh or hazardous locations it is important to know their locations and what maintenance issues might be introduced by those locations. The ability to know a product location and that status of the product are important pieces of data that can, for example, enable a maintenance crew to be directed to faulty equipment. Accordingly, the present disclosure is directed to system and methods for commissioning and maintaining field-deployed industrial products, which can includes but are not limited to electrical fittings and glands, motor and pump control components, panelboards incorporating circuit breakers or other electrical components, switches such as safety switches, enclosures (e.g., terminal enclosures, outlet boxes, junction boxes, explosion-proof enclosures, etc.), lighting and light fittings, plugs and receptacles.

With respect to commissioning, the system is configured to utilize a smart device application to establish a location, identity and/or image of a field-deployed industrial product and transmit that data to a central location for ready-access. With respect to maintaining, the system utilizes real-time and/or historic data relating to the internal and external environments of the commissioned, field-deployed products, as well as parameters relating to the specific operation of the commissioned, field-deployed products to determine an overall product health score and escalating warning system that provides a means by which to establish a preventative maintenance program and efficiently allocate maintenance budgets. This system is particularly suited to enclosures and the industrial equipment contained therein, where maintenance are not easily assess by visual inspection.

Figure 1:
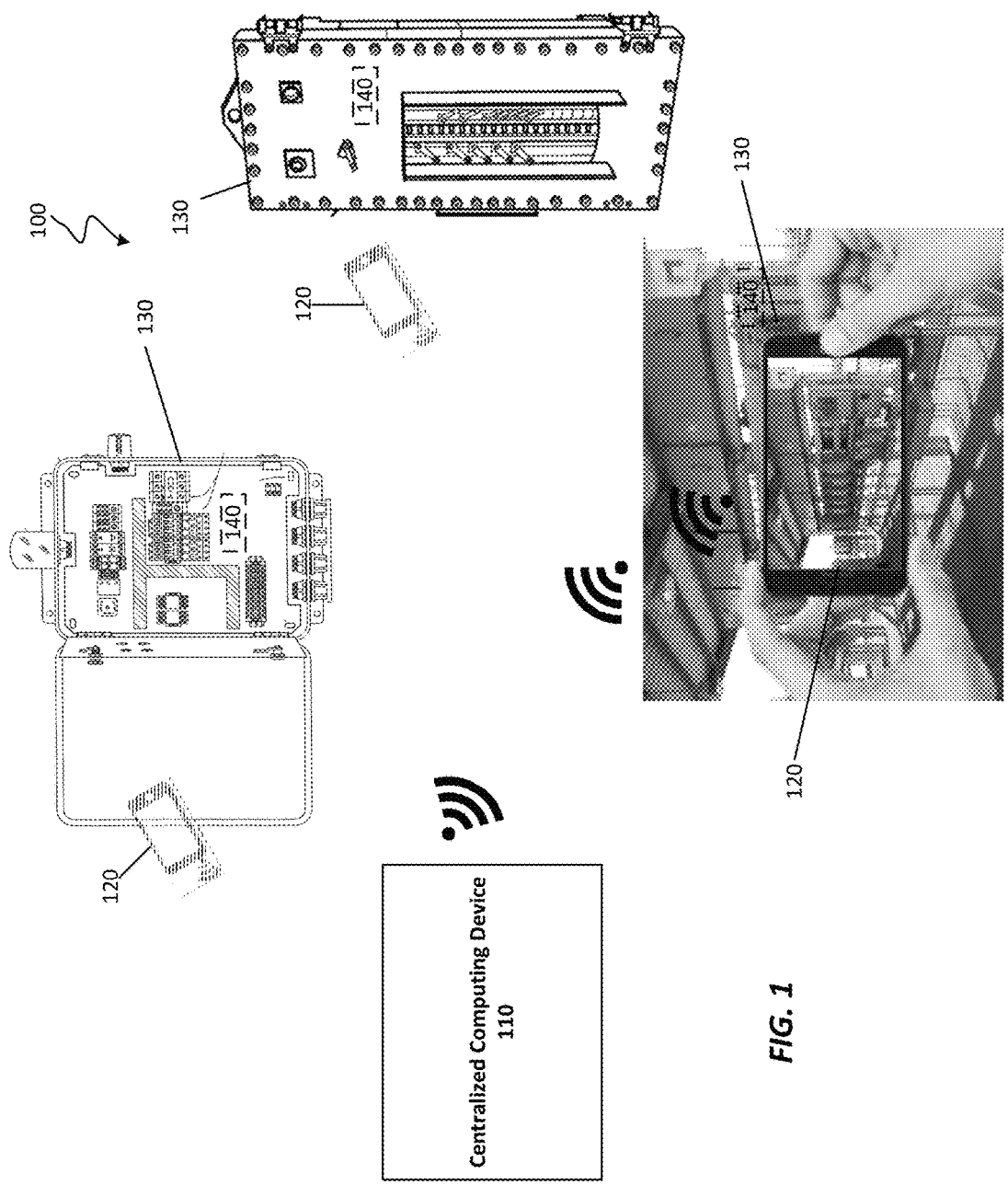
FIG. 1 is a schematic of an example of the application based, GPS location commissioning system according to the present disclosure.

A system 100 that can be used for an application based global positioning system (GPS) location commissioning system and/or a health monitoring system is illustrated in FIG. 1. As shown the system 100 generally includes a centralized computing device 110 as well as one or more smart devices 120 (e.g., smart phone, tablet, etc.) equipped with an application for commissioning of one or more field-deployed products 130. Each of the field-deployed products 130 is equipped with wireless communication device 140 such as a Bluetooth LE (low energy) device, RFID device, NFC (near field communication) device, WirelessHART device, WiFi device or other wireless transmitting device (e.g. transceiver). Each of the wireless communication devices 140 is associated with one or more of the products 130 and is capable of transmitting a unique identification (ID) 130. The centralized computing device 110 and the smart device(s) 120 are configured for wireless and/or wired data transfer. The smart device(s) 120 typically include a standard global positioning system (GPS) and one or more accelerometers which can be used in the commissioning process described below.

Figure 2:
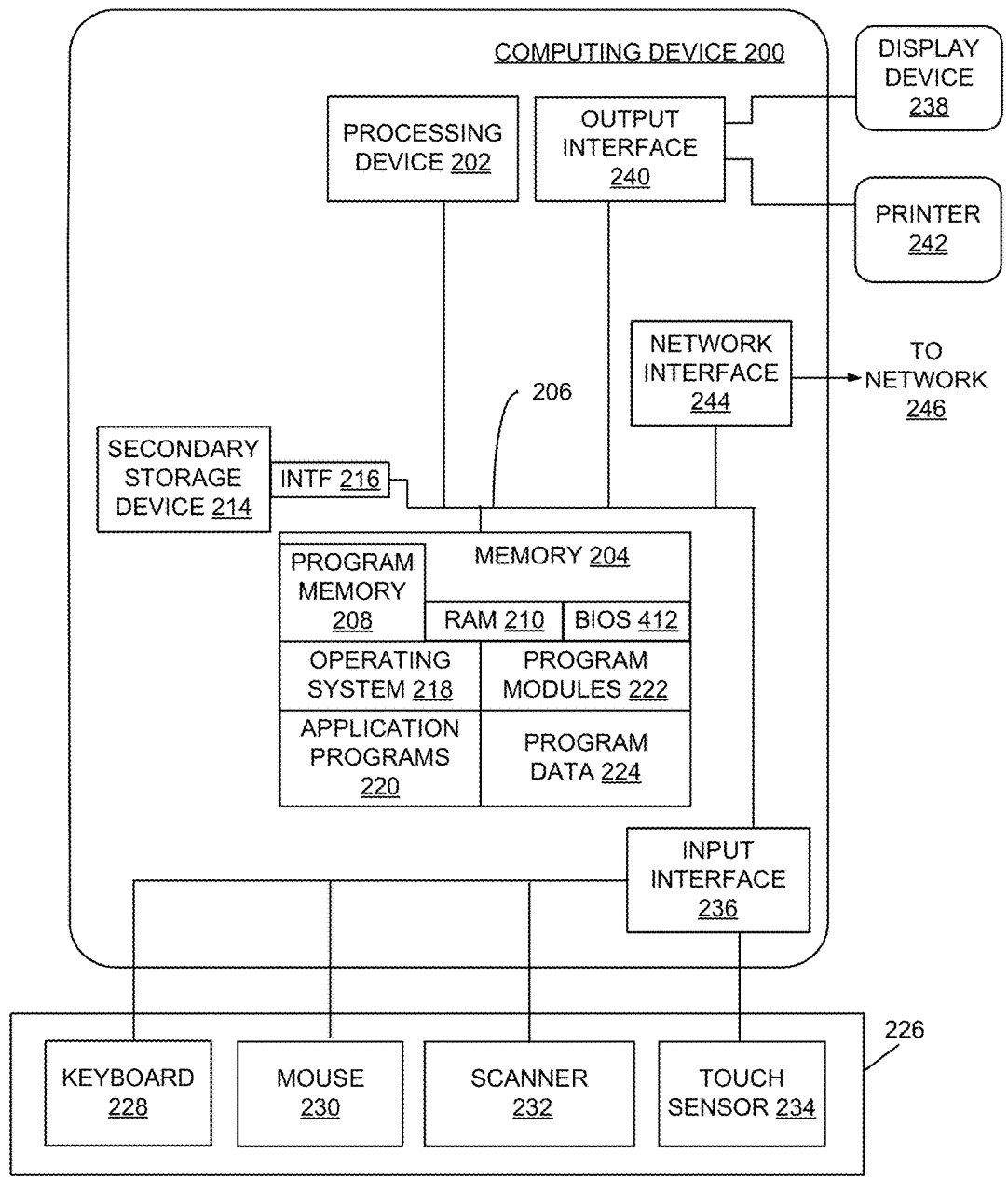
FIG. 2 is a block diagram of an example computing device configured for use in the system of the present disclosure.

FIG. 2 illustrates an exemplary architecture of a computer device 200 that can be used to implement aspects of the present disclosure including the centralized computing device 110 and the one or more smart devices 120. In representing the centralized computing device 110, the computing device 200 can be in any suitable form including a microcontroller, a microprocessor, a desktop computer, a laptop computer, a tablet computer, or other devices configured to process digital instructions. In representing the smart device 120, the computing device 200 can be in any suitable form including a microcontroller, a microprocessor, a mobile computing device (e.g., smart phone, iPod™, iPad™, or other mobile device), or other mobile devices configured to process digital instructions. Accordingly, to avoid undue repetition, this description of the computing device 200 will not be separately repeated herein for each of devices 110 and 120. Rather, it is understood that the exemplary computing device 200 may be configured specific to its intended use incorporating various peripherals and programming instructions, as described herein, to achieve desired operations. Further, it is understood that the computing device 200 is an example of programmable electronics, which may include one or more such computing devices, and when multiple computing devices are included, such computing devices can be coupled together with a suitable data communication network so as to collectively perform the various functions, methods and operations disclosed herein.

In general terms, the computing device 200 includes at least one processing device and at least one computer readable storage device. The processing device operates to execute data instructions stored in the computer readable storage device to perform various operations, methods, or functions described herein.

In more particular terms and with reference to FIG. 2, the computing device 200 includes at least one processing device 202, such as a central processing unit (CPU), as well as a system memory 204 and a system bus 206. The system bus 206 couples various system components including the system memory 204 to the processing device 202. The system bus 206 is one of any number of types of bus structures including a memory bus, a peripheral bus, and a local bus using any variety of bus architectures.

The system memory 204 includes program memory 208 and random access memory (RAM) 210. A basic input/output system (BIOS) 212 containing the basic routines that act to transfer information within the computing device 200, such as during start up, is typically stored in the program memory 208. In some embodiments, the computing device 200 also includes a secondary storage device 214, such as a hard disk drive or file server, for storing digital data. The secondary storage device 214 is connected to the system bus 206 by a secondary storage interface (INTF) 216. The secondary storage device 214, and its associated computer readable media, provides nonvolatile storage of computer readable instructions (including application programs and program modules), data structures, and other data for the computing device 200.

Although the exemplary computing device 200 described herein employs a secondary storage device 214, in some the embodiments the secondary storage device is eliminated or its hard disk drive/file server configuration is replaced with an alternative form of computer readable storage media. Alternative forms of computer readable storage media include, but are not limited to, magnetic cassettes, flash memory cards, digital video disks, Bernoulli cartridges, compact disc memories, digital versatile disk memories, and random access memories. Some embodiments of the secondary storage devices 214 include non-transitory media.

Further, the computer readable storage media can include local storage or cloud-based storage.

A number of program modules can be stored in the memory 204, or the secondary storage device 214. These program modules include an operating system 218, one or more application programs 220, other program modules 222 as described herein, and program data 224. The computing device 200 can utilize any suitable operating system, such as Microsoft Windows™, Google Chrome™, Apple OS, and any other operating system suitable for a computing device.

The computing device 200 typically includes at least some form of computer readable media, e.g., computer readable media within the memory 204 or secondary storage device 214. Computer readable media includes any available media that can be accessed by the computing device 200. By way of example, computer readable media includes computer readable storage media and computer readable communication media.

Computer readable storage media includes volatile and nonvolatile, removable and non-removable media implemented in any device configured to store information such as computer readable instructions, data structures, program modules or other data. Computer readable storage media includes, but is not limited to, random access memory, read only memory, electrically erasable programmable read only memory, flash memory or other memory technology, compact disc read only memory, digital versatile disks or other optical storage, magnetic cassettes, magnetic tape, magnetic disk storage or other magnetic storage devices, or any other medium that can be used to store the desired information and that can be accessed by the computing device 200.

In some embodiments, a user provides inputs to the computing device 200 through one or more input devices 226. Examples of input devices 226 include a keyboard 228, a mouse 230, a camera/scanner 232, and a touch sensor 234 (such as a touchpad or touch sensitive display). In some embodiments, the input devices 226 are incorporated into the computing device 200 itself. In some embodiments, the input devices 226 are external to the computing device 200 and are connected to the processing device 202 through an input interface 236 that is coupled to the system bus 206. The input devices 226 can be connected by any number of input/output interfaces, such as parallel port, serial port, game port, universal serial bus, or a custom interface. Wireless communication between input devices and the input interface 236 is possible as well, and includes infrared, BLUETOOTH® wireless technology, 802.11/a/b/g/n, cellular, or other radio frequency communication systems in some possible embodiments.

In the example embodiment of FIG. 2, the computing device 200 incorporates within or is operably coupled to a display device 238. Examples of the display device 238 include a monitor, a liquid crystal display device, a projector, or a touch sensitive display device. The display device 238 is also connected to the system bus 206 via an output interface 240, such as a display controller. In addition to the display device 238, the computing device 200 can control via output interface 240 various other peripherals such as a printing device 242 or speaker (not shown). As with the input interface 236, the output interface 240 can comprise any number of input/output interfaces such as those described in the paragraph above.

The computing device 200 further includes a network interface 244 that includes a network communication device to communicate digital data across a data communication network 246. An example of the network interface 244 includes a wireless transceiver for transmitting digital data over a wireless network. The wireless transceiver is configured to work with one or more wireless communication technologies such as cellular communication, Wi-Fi communication (such as that conforming to one of the IEEE 802.11 family of communication protocols), Bluetooth® communication, and the like. In other embodiments, the network interface 244 is an Ethernet network interface device having an Ethernet port for receiving an Ethernet cable to transmit and receive digital data across the Ethernet cable to a network 246 such as a local area network or the Internet.

Figure 3A:
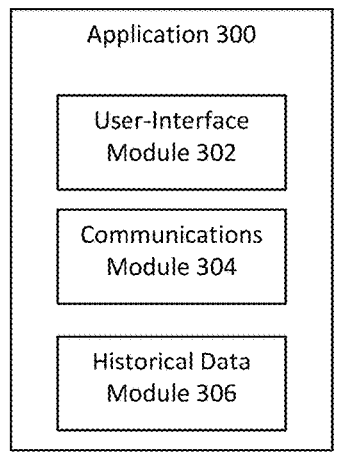
FIGS. 3A and 3B illustrate an example of the programming modules of an application configured to operate on a smart device and a flowchart illustrating example operations capable of being performed by one or more of the programming modules, respectively.

Referring to FIG. 3A, each of the smart devices 120 is equipped with a programmed application 300 that includes various program modules, e.g., program modules 222 of FIG. 2, such as a user-interface module 302, a communications module 304, and a historical data module 306. The user-interface module 302 operates to the provide the user of the smart device 120 with one or more interactive graphical displays from which the user may complete the commissioning process while the communications module 304 enables transmission of the commissioning data from/to the commissionable field-deployed product 130 and/or from/to the centralized computing device 110; the historical data module 306 provides analysis of and/or access to data related to commissioned field-deployed products. However, any number of modules and/or combination of program modules may be used to achieve the desired performance of the smart device 120.

Figure 4A:
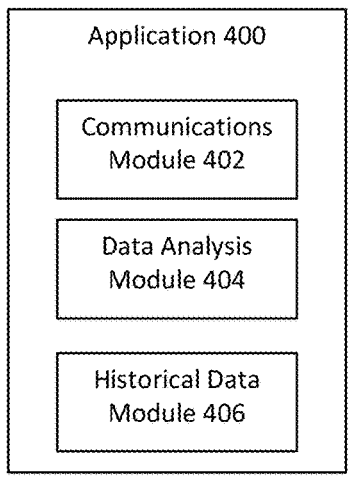
FIGS. 4A and 4B illustrate an example of the programming modules of an application configured to operate on a central computing device and a flowchart illustrating example operations capable of being performed by one or more of the programming modules, respectively.

Referring to FIG. 4A, the centralized computing device 110 is equipped with a programmed application 400 that operates on the data transmitted from the smart device(s) 120 using various program modules such as a communications module 402 to receive/transmit commissioning data, a data analysis module 404 to analyze and relate received commissioning data to product information, and historical data module 406 provides analysis of and/or access to data related to commissioned field-deployed products. However, any number of modules and/or combination of program modules may be used to achieve the desired performance of the centralized computing device 110.

Figure 3B:
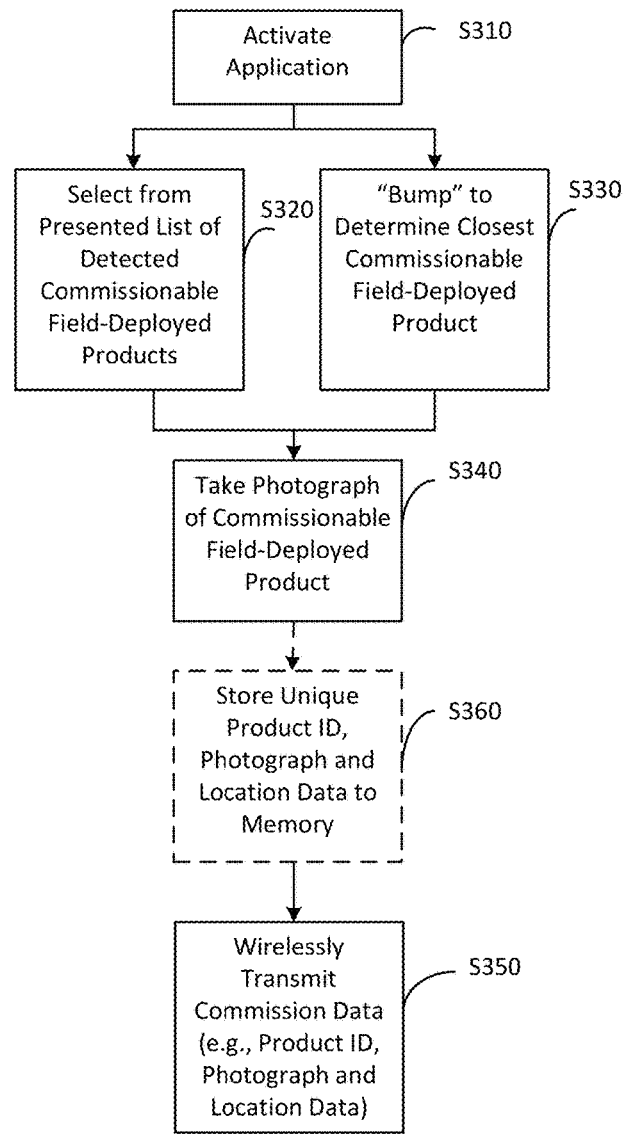
Figure 4B:
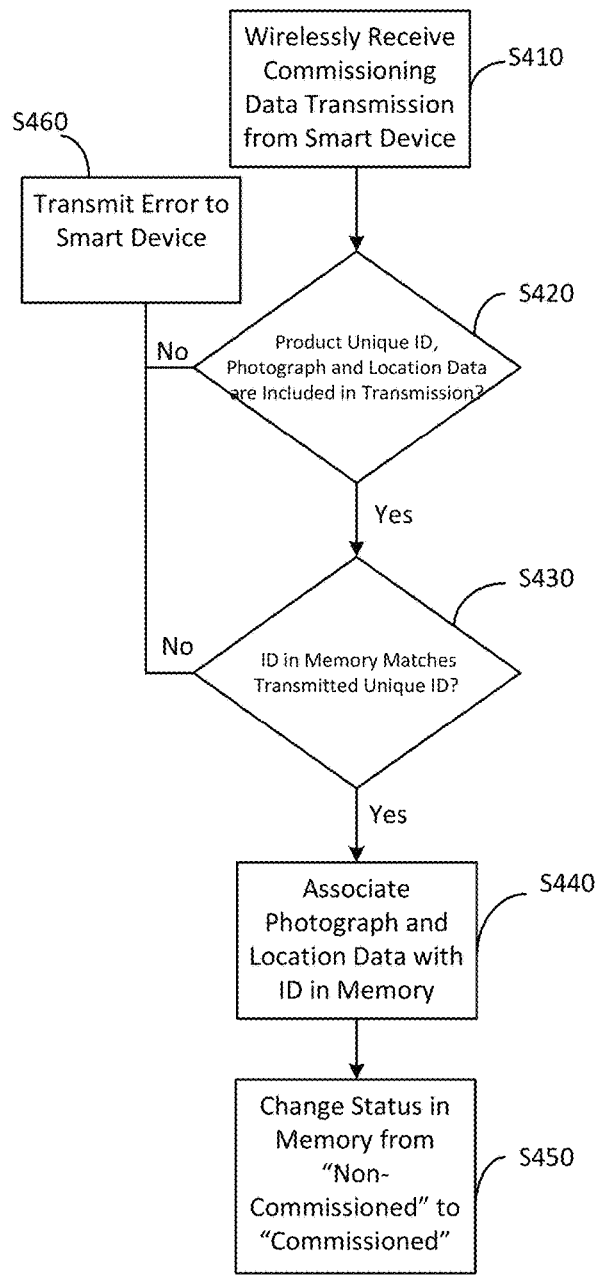

In an example operation, referring to FIG. 3B, the application 300 on the smart device 120 is activated, S310 and the user is presented with a list of commissionable field-deployed products 130 that the smart device 120 is able to detect within a localized area (e.g., each commissionable field-deployed product 130 transmits a wireless signal with the communication device 140 installed therein), S320. Alternatively, the user can "Bump" one of commissionable field-deployed products 130, whereby a standard accelerometer within the smart device detects the "Bump" and the local signal strengths to determine the closest commissionable field-deployed product 130, S330. Upon selection of a commissionable field-deployed product 130, via list or "Bump", the user is prompted by the application 300 on the smart device 120 to take a photograph of the commissionable field-deployed product 130, S340. The taken photograph includes global positioning system (GPS) coordinates in its exchangeable image file format (EXIF) data which can be utilized as device location data. The unique ID of the commissionable field-deployed product 130, photograph and device location data are then wirelessly transmitted to the centralized computing system 110 as established commissioning data, S350. If wireless transmission is not immediately possible, the commissioning data can optionally be stored to memory in the smart device 120 for later wireless transmission, S360. The commissioning process described above can be repeated for any number of field deployable products 130 with which the smart device 120 is capable of communicating. Further, in certain examples, if the GPS data is not available, e.g., not provided in the EXIF, the accelerometers within the smart device 120 may be used as an INS (inertial navigation system) reference from a point where the GPS signal is available to establish device location data In an example operation, referring to FIG. 4B, the application 400 on the centralized computing device 110 is used to receive the commissioning data transmission from the smart device, S410. The application 400 then analyzes the commissioning data transmission to ensure that all three components (e.g.: (1) the unique ID; (2) the photograph; and (3) the device location data) of the commissioning data are present, S420. If all three components of the commissioning data are indeed present, S420—YES, and a corresponding ID within the centralized computing device memory matching the unique ID exists, S430—YES, the application 400 operates to associate the photograph and location data, e.g., GPS data, with the corresponding ID in the centralized computing device memory, S440. The application 400 further operates to change a status in memory related to the corresponding ID from a "non-commissioned" status to a "commissioned" status, S450.

If all three of the components of the commissioning data are not present, S420—NO, or if the unique ID in the transmitted commissioning data does not match a corresponding ID in the centralized computing device memory, S430—NO, an error notification is transmitted back to the user at the smart device 120, S460 and the user is provided with the option to: (a) re-transmit the commissioning data; (b) take a new photograph and obtain new device location data for transmission; or (c) cancel current commissioning process. If the option to cancel is chosen, the user is returned to S320 or S330 (see FIG. 3B).

Further, at any time, the user may opt to access data related to field-deployed products 130 having the status "commissioned." More specifically, the user may access the device location data and the photograph of a commissioned field-deployed product 130 to more easily locate the field-deployed product for maintenance or other needs.

The application based GPS location commissioning system and process greatly simplifies the commissioning process that is used today while little to no associated extra cost. As such, the application based GPS location commissioning system and process increases the likelihood of adoption, reduces errors and decreases commissioning costs. Further it may be implemented through a user-friendly App that may be used by numerous types of smart devices. The application based GPS location commissioning system and process can increase the value that the field-deployed products provide to a solution.

In certain examples, the application 300 of the smart device 120 can additionally be configured to provide other options related to the field-deployed product 130. These options include the ability to use the smart device 120 to photograph or scan a nameplate, UPC code, or other identifier on the product which may then be used and matched to a product layout template, stored in the smart device memory or the centralized computing device memory. The product layout template, e.g., a software template, may subsequently be auto-populated in correspondence with the specific field-deployed product data and can include, for example, manufacturing dates, serial number, model numbers, and other data specific to the commissioned, field-deployed product.

For example, a panel board breaker layout or motor control equipment layout may be auto-populated based on the product identifier obtained/entered at the start of product commissioning. This populated product template may be returned to the user/product installer for reference during product installation and/or during product maintenance. The populated product template may additionally identify the location of various monitoring and/or sensing devices within the product that may be used to monitor health factors of the product.

Figure 5:
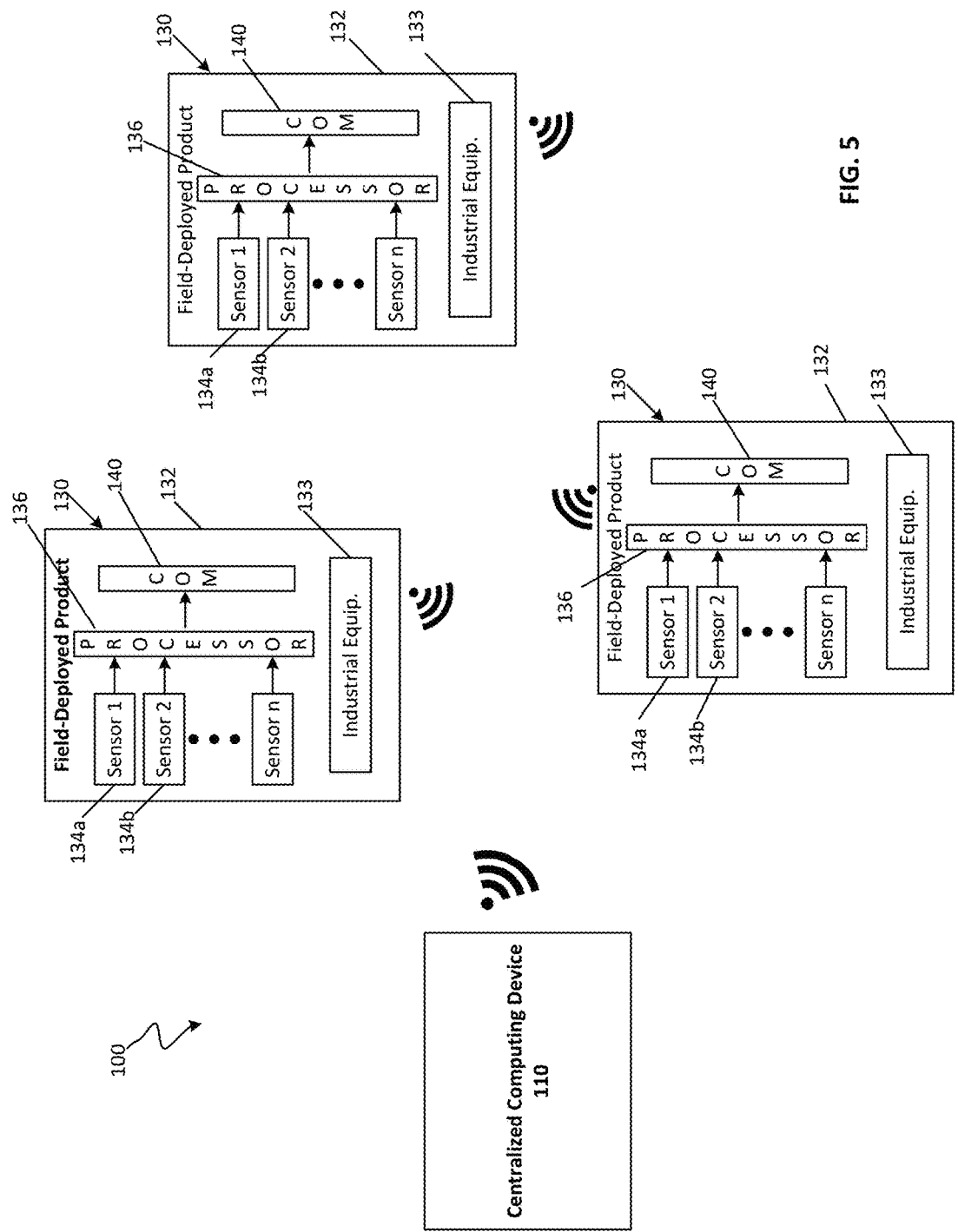
FIG. 5 is a block diagram representation of the schematic of FIG. 1.

FIG. 5 illustrates, in block diagram form, the system 100, which can be used as an application based global positioning system (GPS) location commissioning system and/or a health monitoring system. The system 100 generally includes a centralized computing device 110 as well as one or more smart devices 120 (e.g., smart phone, tablet, etc., see FIG. 1) equipped with an application for commissioning of one or more field-deployed products 130. Each of the field-deployed products 130 is equipped with wireless communication device 140 such as a Bluetooth LE (low energy) device, RFID device, NFC (near field communication) device, WirelessHART device, WiFi device or other wireless transmitting device (e.g. transceiver). Each of the wireless communication devices 140 is associated with one or more of the products 130 and is capable of transmitting a unique identification (ID) 130. In certain examples the wireless communication device 140 is configured to transmit to local wireless devices, e.g. smart devices 120 (see FIG. 1) or remote wireless devices, e.g., the centralized computing device 110. In certain examples, the centralized computing device 110 and the smart device(s) 120 are configured for wireless and wired data transfer.

Each of the field-deployed products 130 typically provides for an enclosure 132 that houses industrial equipment 133 (e.g., circuit breaker panel boards, motor control equipment, lighting equipment, switch gear equipment, metering equipment, etc.). In certain examples, the commissioned, field-deployed product 130 can be adapted to be deployed in a harsh or hazardous environment, such as a ClassI/Div1/Div2 (e.g., Class I, Division 1 or Class I, Division 2) environment as defined by the National Electric Code (NEC). Further, each of the field deployed products 130 is equipped with one or more sensors 134 coupled to a processor 136 (e.g., corresponding to processor 202 of FIG. 2), which is configured to execute instructions stored in a localized or remote memory, and wireless communication device 140 operably coupled to the processor 136 for transmitting and/or receiving data including sensor data. In certain examples, the sensors 134 are within the enclosure 132 while in other examples the sensors 134 are external to the enclosure 132 or located remotely from the enclosure 132. In certain examples, the processor 136 is contained within the enclosure 132 while in others the processor 136 is located remotely from the enclosure 132. Similar, the wireless communication device can be contained within the enclosure 132 or can be positioned remotely from the enclosure 132. Power (not shown) is provided to the industrial equipment, sensors 134, processor 136 and transceiver 138 through system power or localized power (e.g., batteries).

Each of the sensors 134 is adapted to sense, or monitor, conditions and/or operations specific to the commissioned, field-deployed product 130. Each of the conditions and/or operations can be deemed health factor data. Accordingly, the output of each sensor 134 is representative of a health factor that can be transmitted to, received by, aggregated and utilized by the centralized computing device 110 to determine an overall healthscore, health-related parameters, and/or a maintenance action plan specific to the commissioned, field-deployed product with which the sensor(s) 134 is associated. The health factor data can, in certain examples, be utilized by the centralized computing device 110 to rank, or otherwise categorize the various commissioned, field-deployed products 130 based on their need for repair. The health monitoring system 100 can establish a real-time degree of degradation (i.e., a health score) for each of the field-deployed products 130 and then categorizes the field-deployed products based on the degree of degradation. The health scores allow the operating conditions of the field-deployed products 130 to be compared on a relative basis.

In certain examples, the field-deployed product 130 can include a first sensor 134*a* and a second sensor 134*b* suitable for interfacing with the processor 136. The first sensor 134*a* is configured to transmit a signal representative of a first health factor of the field-deployed product 130. The second sensor 134*b* is configured to transmit a signal representative of a second health factor of the same field-deployed product 130 with the second health factor being different from the first health factor. The health factors can correspond to different parameters such as acute environmental parameters, chronic environmental parameters, performance/operational parameters, wear parameters and other parameters. Acute environmental parameters can relate to extreme environmental conditions experienced by the field-deployed product 130 for a relatively short amount of time such as extreme high or low temperatures, extreme impact or vibration levels, extreme pressures or extreme moisture levels. Chronic environmental parameters can relate to environmental conditions experienced by the field-deployed product 130 over extended periods of time such as the temperatures, humidity levels and vibration levels to which the field-deployed product 130 is normally exposed. Performance/operational parameters can involve data such operational efficiency and actual run-time data. Wear parameters can relate to data linked directly to wear such as corrosion levels, material strain or stress, and changes in manufactured tolerances (e.g., gap sizes particularly relating to flame paths in explosion proof enclosures).

Monitored product conditions serve as health factors that may be included in the overall health score calculation. These health factors include, but are not limited to:

Ambient Temperature—e.g., temperature external to the field-deployed product enclosure measured with, for example, a temperature sensor;

Surface Temperature—e.g., the temperature of the field-deployed product enclosure body or lid measured with, for example, a temperature sensor;

Internal Equipment Temperature—e.g., the temperature of a specific piece of equipment within the field-deployed product 130 measured with, for example, a temperature sensor;

Stress/Strain—e.g., the stress/strain on the field-deployed product enclosure, a specific piece of product equipment within the field-deployed product enclosure and/or a field-deployed product mounting fixture measured with, for example, a strain gauge;

Pressure—e.g. either atmospheric or within the field-deployed product enclosure (a large, quick increase may indicate an explosion), measured with, for example, a pressure sensor;

Shock/Vibration—e.g., shock/vibration of the field-deployed product enclosure, a specific piece of product equipment within the field-deployed product enclosure and/or a field-deployed product mounting fixture measured with, for example, an accelerometer;

Humidity/Dew Point—e.g., the humidity/dew point within or to the exterior of the field-deployed product 130 measured with, for example, a humidity sensor;

Accumulated Moisture Level—e.g., the amount of water or water level in the interior of the field-deployed product enclosure measured with, for example, a capacitive sensor;

Communication Status—e.g., communication between the processor at the field-deployed product 130 and the processor at the centralized computing device 110 indicated by absence of communication;

Control Device Status—e.g., whether a control device (e.g., active breather drain, circuit breaker, switch, etc.) of the field-deployed product 130 is on/off, open/closed, tripped, etc. as indicated by, for example, a toggle bit;

Flame-Path Gap Measurement—e.g., whether the joint between lid and enclosure of an explosion proof, field-deployed product is maintaining an acceptable flame-path gap measured with, for example, a capacitive sensor;

Corrosion—e.g., whether the field-deployed product enclosure or product equipment (e.g., electrical contacts, etc.), are corroded measured with, for example, a corrosion sensor;

Run Time—e.g., how long the field-deployed product 130 has been operating measured with, for example, a timer/clock of the product processor;

Efficiency—e.g., how efficiently a specific piece of product equipment (e.g., light fixture, power supply) is operating, measurement determined by known means;

Installation Date (Age of Product/Time Spent in Hazardous Conditions)—e.g., how long the field-deployed product 130 has been in the field since commissioning, measurement determined by known means;

Down Time Including Brown Out—e.g., how long the field-deployed product 130 has ceased operation due to failure and/or maintenance measured, for example, by time calculation based on logged failure and/or maintenance events;

Specific Equipment Operational Parameters—e.g., product equipment current, voltage, impedance, resistance, flow, velocity, etc., measured, for example, with known means;

Maintenance—e.g., type of maintenance performed on the field-deployed product 130 based, for example, on logged maintenance events.

The overall health score may additionally incorporate health factors relating to product alerts. Alerts occur when a monitored parameter falls outside of a desired operating range. The alert health factors may include, but are not limited to:

Active Alerts—e.g., alerts that are actively ongoing;

Past Alerts—e.g. past alerts incorporating whether the alert was resolved and how long ago the alert occurred Chronic Alerts—e.g., alerts that occur, are resolved, and occur again within various time periods.

Utilizing some, or all, of the relevant and desired health factors described above, an overall health score for a field-deployed product 130 may be determined. In determining the overall health score, some health factors may be given more or less weight, as appropriate, with negative health factors reducing the overall health score and positive health factors increasing the overall health score. Weightings can be based on exposure times and magnitudes of sensed values. The health score may be determined by the processor 136 within the enclosure 132 of the field-deployed product 130 and transmitted to a smart device 120 (see FIG. 1) and/or the centralized computing device 110, or, alternatively, the overall health score may be determined solely by centralized computing device 110. Active and chronic alerts negatively affect the health score and can be weighted more heavily than past alerts. Past alerts can be reduced in weight as time passes without a repeat occurrence of the non-compliant parameter.

In certain examples, the overall health score is a single number normalized from 0 to 1, and represented as a percentage with 100% being healthy and 0% meaning replacement or immediate maintenance is required. If desired, the single number can be banded into several severity categories (e.g., Immediate Action<50%; Take Action Soon 50-80%; Keep-an-Eye-on 80-90%; No Problem 90-100%), with each severity category prompting a certain maintenance action. Further, the central monitoring system can provide the overall health score in conjunction with an analysis providing a general indication, or even pinpointing, where a problem is occurring as well as what replacement parts and/or tools might be necessary to address the problem.

Some health score parameters can be sensed and can be weighted differently based on the magnitudes of the sensed parameters. For example, field-deployed products 130 consistently exposed to higher chronic health factors such as higher temperatures, humidities and/or vibrations will receive lower health heath scores than those consistently exposed to lower chronic health factors. If the field-deployed product 130 is more frequently exposed to acute environmental health parameters, its health score will be lower than a field-deployed product that has less frequently been exposed to acute environmental factors. An extremely high reading relating to an acute environmental health factor can indicate a possible catastrophic event and can cause the health rating of the field-deployed product 130 to immediately move to the immediate action category. Similarly, wear based health care readings (strain, corrosion, gap spacing tolerances, etc.) can also be weighted based on the magnitudes of the readings and if such readings move beyond a predetermined level can cause the health rating of the field-deployed product 130 to immediately move to the immediate action category. The detection of a connectivity fault for a certain period of time can cause the health rating of the field-deployed product 130 to immediately move to the immediate action category. If an active alert remains active for a predetermined period of time, the health rating of the field deployed product 130 can move to the immediate action category. If a chronic alert repeats for a predetermined number of times, the health rating of the field-deployed product 130 can move to the immediate action category. If a past alert corresponding to the field-deployed product 130 remains fixed without problem over time, the negative value of the previous associated alert can be de-weighted thereby improving the health score of the field-deployed product.

Some of the health parameters relate to historic data that is not sensed. Examples of historic data include installation date, manufacturing date, expected lifespan, and maintenance history. The age of the field-deployed product 130 can become more heavily weighted over time such that a product's health score reduces with age. Product age can be monitored in combination with sensed data such as equipment run times. If an age/runtime rating of the field-deployed product 130 moves beyond a predetermined level, the health care reading of the field-deployed product 130 can move to the immediate action category. Maintenance entries can have different weights based on the category of the maintenance. For example, a full replacement can re-set the age of the field-deployed product 130 to match new equipment. Partial replacement can reduce the age value of the field-deployed product 130 but not reach the level of a new the field-deployed product 130. Non-replacement type adjustments and repairs may not affect the age value of the field-deployed product 130.

The system and processes described above provide for remotely collected health data to be processed and used to generate a discrete health score for each field-deployed product. The health scores can be used collectively to prioritize which field-deployed product should be served most promptly. In this way, a service/maintenance hierarchy for the entire system can be generated that allows serving resources to be allocated most efficiently and reduces the likelihood of catastrophic equipment failures. Servicing can include actions such as visual inspection, physical testing, repair, partial replacement and full replacement. The system can also use the data to maximize the efficiency of a given service/maintenance event by pre-identifying potential problem areas and by recommending certain remedial actions as part of an automated service request. This allows the technician to prepare in advance for the service call by pre-ordering certain parts predicted to be faulty by the health monitoring system. Additionally, the technician can appropriately be equipped with the suitable testing and repair equipment needed to address the fault predicted by the health monitoring system.

Systems, devices or methods disclosed herein may include one or more of the features, structures, methods, or combination thereof described herein. For example, a device or method may be implemented to include one or more of the features and/or processes above. It is intended that such device or method need not include all of the features and/or processes described herein, but may be implemented to include selected features and/or processes that provide useful structures and/or functionality.

Various modifications and additions can be made to the disclosed embodiments discussed above. Accordingly, the scope of the present disclosure should not be limited by the particular embodiments described above, but should be defined only by the claims set forth below and equivalents thereof.

What is claimed:
1. A system comprising:
a smart device having a processor and a memory, the smart device processor configured to execute instructions stored in memory and cause the smart device to:
wirelessly detect both the presence of a non-commissioned field-deployed product and a unique identification (ID) associated with the non-commissioned field-deployed product, wherein the non-commissioned field-deployed product is located within a Class I, Division 1 or Class I, Division 2 location as defined by the National Electric Code;
take a photograph of the non-commissioned field-deployed product;
obtain location data of the non-commissioned field-deployed product, wherein the location data is obtained from global positioning system (GPS) coordinates included an in an exchangeable image file format (EXIF) associated with the photograph or the location data is obtained from inertial navigation system (INS) of the smart device; and wirelessly transmit the unique ID, photograph and location data to establish a commissioned status of the non-commissioned field-deployed product.

2. The system of claim 1, wherein the unique ID is wirelessly detected via a wireless technology comprising near field communication (NFC), Bluetooth LE (low energy), WirelessHART, WiFi and/or radio frequency identification (RFID).

3. The system of claim 1, wherein non-commissioned field-deployed product comprises: enclosures, circuit breaker panel boards, motor control equipment, lighting equipment, switch gear equipment, and/or metering equipment.

4. The system of claim 1, wherein execution of instructions stored in memory cause the smart device to access data related to a commissioned field-deployed product.

5. The system of claim 1, wherein the data related to the commissioned field-deployed is stored in the memory of the smart device or remotely from the smart device.

6. A system comprising:
a smart device and a computing device;
the smart device having a processor and a memory, the smart device processor configured to execute instructions stored in the smart device memory and cause the smart device to:
wirelessly detect both the presence of a non-commissioned field-deployed product and a unique identification (ID) associated with the non-commissioned field-deployed product, wherein the non-commissioned field-deployed product is located within a Class I, Division 1 or Class I, Division 2 location as defined by the National Electric Code;
take a photograph of the non-commissioned field-deployed product;
obtain location data of the non-commissioned field-deployed product, wherein the location data is obtained from global positioning system (GPS) coordinates included an in an exchangeable image file format (EXIF) associated with the photograph or the location data is obtained from inertial navigation system (INS) of the smart device; and
wirelessly transmit the unique ID, photograph and location data to the centralized computing device
the computing device having a processor and a memory, the computing device processor configured to executed instructions stored in the computing device memory and cause the computing device to perform:
wirelessly receive the transmission from the smart device;
verify that each of the unique ID, photograph and location data are included in the transmission;
verify that the transmitted unique ID matches a corresponding ID in the computing device memory;
when both verifications occur, associate the photograph and location data with the corresponding ID in the computing device memory; and
change a status of the non-commissioned field-deployed product from non-commissioned to commissioned.

7. The system of claim 6, wherein the unique ID is wirelessly detected via a wireless technology comprising near field communication (NFC), Bluetooth LE (low energy), WirelessHART, WiFi and/or radio frequency identification (RFID).

8. The system of claim 6, wherein non-commissioned field-deployed product comprises: enclosures, circuit breaker panel boards, motor control equipment, lighting equipment, switch gear equipment, and/or metering equipment.

9. The system of claim 6, wherein execution of instructions stored in memory cause the smart device to access data related to a commissioned field-deployed product.

10. The system of claim 6, wherein the data related to the commissioned field-deployed product is stored in the memory of the smart device or remotely from the smart device.

11. A system comprising:
a smart device having a processor and a memory, the smart device processor configured to execute instructions stored in memory and cause the smart device to:
take a photograph of a non-commissioned field-deployed product, wherein the photograph includes an image of a nameplate of the non-commissioned field-deployed product, the nameplate including a unique product identification (ID);
generate product configuration data based on the unique product ID; and
wirelessly transmit the unique product ID, photograph and product configuration data to establish a commissioned status of the non-commissioned field-deployed product.

12. A system comprising:
a field-deployed product including industrial equipment, the field-deployed product configured for placement in a Class I, Division 1 or Class I, Division 2 location as defined by the National Electric Code;
a plurality sensors, each of the plurality of sensors configured to monitor a different operational and/or environmental parameter relative to the field-deployed product and produce an output representative of the operational and/or environmental parameters;
a wireless communication device configured to wirelessly transmit the output; and
a computing device configured to receive the outputs and determine an overall healthscore for the field-deployed product based on the received outputs, the computing device further configured to categorize a severity of the healthscore and produce a recommendation for maintenance of the field-deployed product based on the severity.

13. The system of claim 12, wherein the field-deployed product further comprises an enclosure, and wherein the plurality of sensors are configured to monitor different operational and/or environmental parameters relative to the enclosure and/or the industrial equipment.

14. The system of claim 12, wherein the industrial equipment comprises circuit breaker panel boards, motor control equipment, lighting equipment, switch gear equipment, and/or metering equipment.

15. The system of claim 12, wherein the healthscore comprises a real-time healthscore.

16. The system of claim 12, wherein the computing device additionally determines the overall healthscore based on historical data.

17. The system of claim 16, wherein the historical data includes the age of the field-deployed product and/or the maintenance history of the field-deployed product.

18. The system of claim 12, wherein the computing device additionally determined the overall health score based on field-deployed product alerts.

19. The system of claim 18, wherein the field-deployed product alerts comprise active alerts, past alerts and/or chronic alerts.

20. The system of claim 12, wherein the operational and/or environmental parameters comprise temperature, humidity, vibration, stress, strain, shock, moisture level, communication status, control device status, flame gap, corrosion and/or run-time.

\* \* \* \* \*